United States Patent
Rud et al.

(10) Patent No.: US 10,760,742 B2
(45) Date of Patent: Sep. 1, 2020

(54) NON-INTRUSIVE PIPE WALL DIAGNOSTICS

(71) Applicant: Rosemount Inc., Shakopee, MN (US)

(72) Inventors: Jason H. Rud, Chanhassen, MN (US); Steven R. Trimble, Prior Lake, MN (US)

(73) Assignee: Rosemount Inc., Shakopee, MN (US)

( * ) Notice: Subject to any disclaimer, the term of this patent is extended or adjusted under 35 U.S.C. 154(b) by 280 days.

(21) Appl. No.: 15/934,101

(22) Filed: Mar. 23, 2018

(65) Prior Publication Data
US 2019/0293241 A1    Sep. 26, 2019

(51) Int. Cl.
| | |
|---|---|
| *G01N 17/00* | (2006.01) |
| *G01N 25/00* | (2006.01) |
| *G01K 7/16* | (2006.01) |
| *F17D 5/06* | (2006.01) |
| *E03B 7/07* | (2006.01) |
| *G01K 1/16* | (2006.01) |
| *G01N 25/18* | (2006.01) |
| *E03B 7/00* | (2006.01) |
| *F16L 101/12* | (2006.01) |

(52) U.S. Cl.
CPC .............. *F17D 5/06* (2013.01); *E03B 7/071* (2013.01); *G01K 1/16* (2013.01); *G01N 17/008* (2013.01); *G01N 25/18* (2013.01); *E03B 7/003* (2013.01); *F16L 2101/12* (2013.01)

(58) Field of Classification Search
USPC ............ 374/57, 147, 208, 44, 183, 166, 1, 7
See application file for complete search history.

(56) References Cited

U.S. PATENT DOCUMENTS

| | | | |
|---|---|---|---|
| 7,624,632 B1 | 12/2009 | Hoyle et al. | |
| 2014/0177673 A1* | 6/2014 | Bliss | G01K 1/16 374/165 |

FOREIGN PATENT DOCUMENTS

WO    2016110696 A1    7/2016

OTHER PUBLICATIONS

International Search Report and Written Oprtion dated Jun. 28. 2019, International Patent Application No. PCT/US2019/022427, 23 pages.

* cited by examiner

*Primary Examiner* — Mirellys Jagan
(74) *Attorney, Agent, or Firm* — Christopher R. Christenson; Kelly, Holt & Christenson, PLLC

(57) ABSTRACT

A pipe diagnostic system includes a sensor capsule, measurement circuitry and a controller. The sensor capsule is configured to be coupled to an exterior surface of a pipe and has at least one temperature sensitive element disposed therein. The measurement circuitry is coupled to the sensor capsule and is configured to measure an electrical characteristic of the at least one temperature sensitive element and provide an indication of the measurement. The controller is coupled to the measurement circuitry and is configured to obtain a transmitter reference measurement and employ a heat transfer calculation with the transmitter reference measurement and the indication to generate an estimated process fluid temperature. The controller is further configured to obtain an indication of process fluid temperature and provide a pipe diagnostic indication based on a comparison of the estimated process fluid temperature and the obtained indication of process fluid temperature.

14 Claims, 10 Drawing Sheets

NON-INTRUSIVE PIPE WALL DIAGNOSTICS

BACKGROUND

Many industrial processes convey process fluids through pipes or other conduits. Such process fluids can include liquids, gasses, and sometimes entrained solids. These process fluid flows may be found in any of a variety of industries including, without limitation, hygienic food and beverage production, water treatment, high-purity pharmaceutical manufacturing, chemical processing, the hydrocarbon fuel industry, including hydrocarbon extraction and processing as well as hydraulic fracturing techniques utilizing abrasive and corrosive slurries.

When fluids are conveyed through pipes, they may form deposits on the inner surface of the pipe. As these deposits grow, they can reduce the ability of the pipe to meet the flow demands of the process. Additionally, it is generally not known at the time of pipe installation, where such deposits will form. Further, when deposits do begin to form, it is important to detect them such that remedial action can be taken.

In some process fluid flow environments, it is also possible for the pipe to wear or otherwise corrode from the inner surface. For example, in the production of natural gas, sand is sometimes entrained in the process fluid flow and can abrade and wear the inner surface of the pipe. Given enough time, such wear could weaken the pipe and increase the potential for breakage or leakage.

Some pipe diagnostic systems require access to the interior of the pipe in order to view or otherwise assess the condition of the interior of the pipe. Such systems generally require the flow to be stopped, and thus the system to be taken offline. Even some systems that allow online pipe diagnostics still require access inside the pipe and thus provide a potential leak point.

U.S. Pat. No. 7,290,540, assigned to the assignee of the present application, provides an acoustic detection system that is able to provide corrosion and fouling detection by coupling to an exterior of a pipe. However, in some environments, with high process noise and/or vibration, such acoustic-based detection may not be optimal.

Accordingly, there is a need for a pipe diagnostic system that can operate in all environments, regardless of acoustics or vibration, when the process system is online, and which does not generate any potential points of leakage.

SUMMARY

A pipe diagnostic system includes a sensor capsule, measurement circuitry and a controller. The sensor capsule is configured to be coupled to an exterior surface of a pipe and has at least one temperature sensitive element disposed therein. The measurement circuitry is coupled to the sensor capsule and is configured to measure an electrical characteristic of the at least one temperature sensitive element and provide an indication of the measurement. The controller is coupled to the measurement circuitry and is configured to obtain a transmitter reference measurement and employ a heat transfer calculation with the transmitter reference measurement and the indication to generate an estimated process fluid temperature. The controller is further configured to obtain an indication of process fluid temperature and provide a pipe diagnostic indication based on a comparison of the estimated process fluid temperature and the obtained indication of process fluid temperature.

DETAILED DESCRIPTION OF ILLUSTRATIVE EMBODIMENTS

Figure 1:
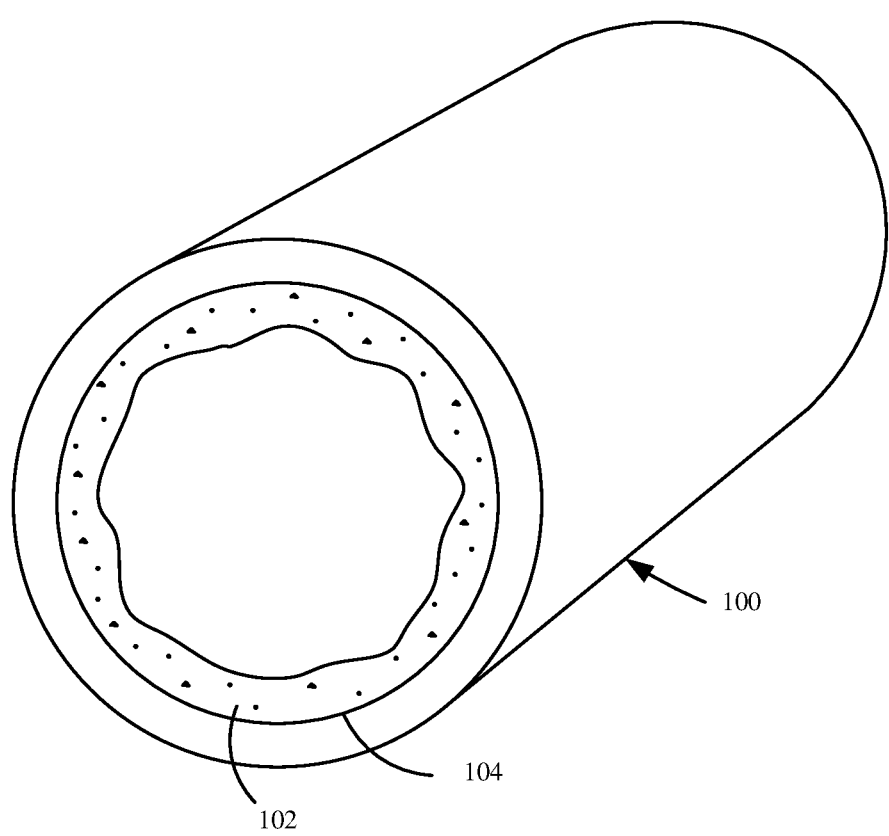
FIG. 1 is a diagrammatic perspective view of a pipe illustrating an internal deposit on the inside surface.

FIG. 1 is a diagrammatic view of a portion of a pipe 100 illustrating scale build-up 102 at inner diameter 104 of pipe 100. Scaling 102 or residue can build-up in pipes, such as pipe 100, reducing the efficiency of the pipe in conveying the process fluid flow. Pipes can be cleaned periodically if it is typical for scaling to occur. The maintenance period may be based on an assumed rate of build-up and is generally not measured. To clean pipes, the process generally needs to be taken offline and a fair amount of time and effort is required. During the cleaning process, the severity of the build-up can be evaluated. If the build-up was not severe, maintenance could have been scheduled for another time in the future.

Pipes can also degrade and thin due to corrosion. In many cases this is a parameter that is assumed using corrosion test coupons. The rate of corrosion on the test coupon corresponds to the rate of process pipe corrosion. Since there are several different corrosion scenarios, corrosion coupons are not 100% effective.

Embodiments described herein generally leverage the change to heat flow characteristics from the process fluid through the pipe wall that occurs when a build-up is present, or conversely, when corrosion or some other process thins the pipe wall. These differences in heat flow can be determined in a number of ways, which will be described below.

Figure 2:
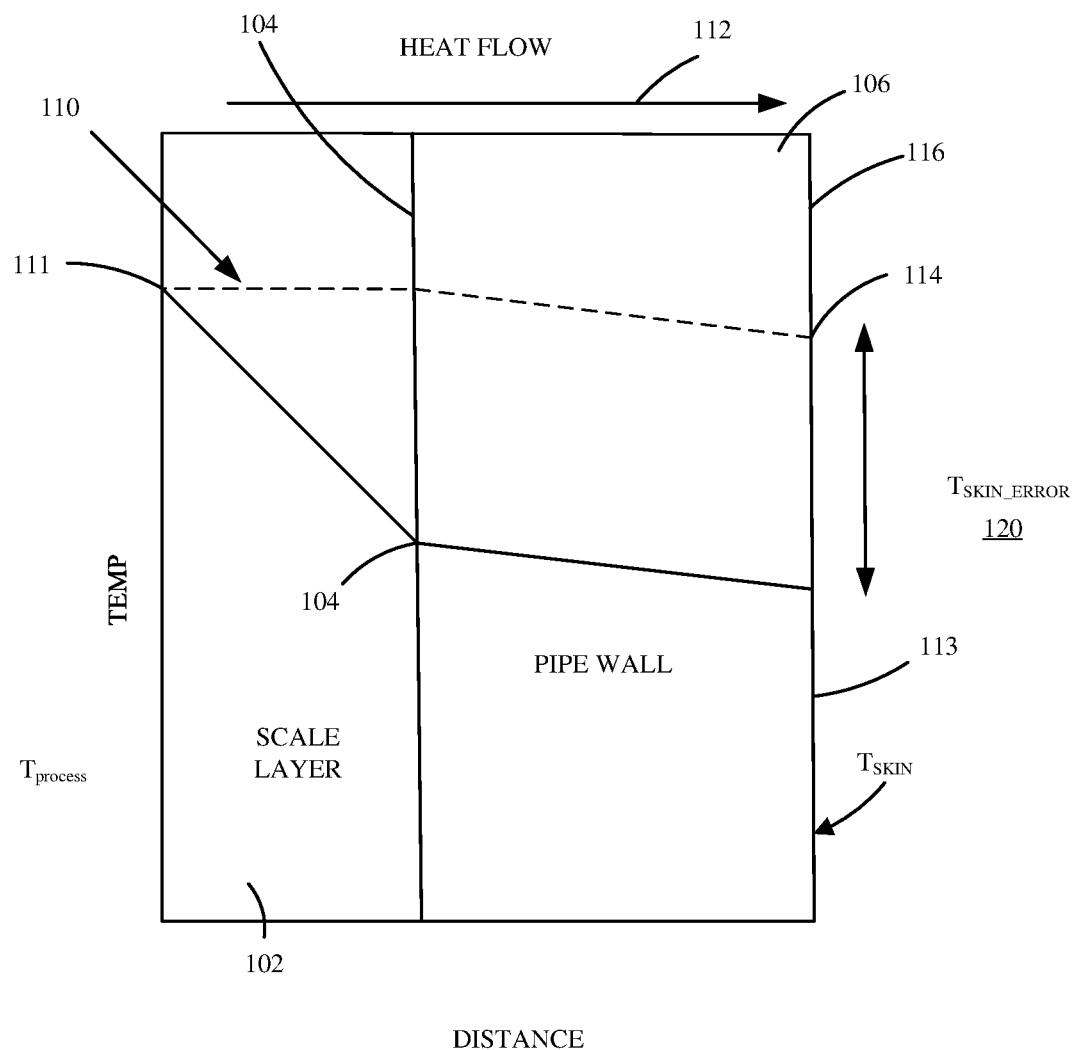
FIG. 2 is a diagrammatic chart illustrating the effect of scale build-up on heat flow from the process fluid when the scale build-up accumulates on an interior surface of a pipe.

FIG. 2 is a diagrammatic chart illustrating heat flow through a scale layer and pipe wall. The left-hand axis is temperature and the horizontal axis corresponds to distance. When no scaling is present, as indicated by dashed line 110, a temperature at pipe wall inner diameter 104 is generally equal to the process fluid temperature 111. Assuming the process fluid temperature is elevated relative to ambient temperature 113, heat flow 112 through pipe wall 106 will generally result in a relatively small but detectable reduction in temperature such that the measured temperature 114 at outside diameter 116 is somewhat lower than the inner diameter 104 temperature. In the illustrated example, ambient temperature 113 is shown directly against the outer surface of pipe wall 106. In cases where insulation or some additional layer is provided around pipe wall 106, ambient temperature 113 would be present at the outer surface of the additional insulation/layer. The magnitude of this temperature difference is dependent on the thermal conductivity of the pipe wall material, as well as the magnitude of the heat flow through the pipe wall.

Metal pipes generally have relatively high thermal conductivity, while polymer-based pipes, such as PVC pipes, have a lower thermal conductivity. When a scale layer, such as scale layer 102 is present, the heat must first flow through the scale layer before flowing through pipe wall 106. Accordingly, the temperature of the surface of the scale layer proximate the process fluid is generally equal to the process fluid temperature 111. However, in the example shown in FIG. 2, scale layer 118 has a relatively lower thermal conductivity than the pipe wall. Accordingly, the magnitude of temperature differential between process fluid temperature 111, and the temperature at inner diameter 104 can be significantly greater than the difference that occurs when the heat flows merely through the pipe wall. As can be seen in FIG. 2, once the heat flows through scale layer 118, the change in temperature through the pipe wall from inside diameter 104 to outside diameter 116 is roughly the same as when no scaling is present. However, by virtue of the heat having to flow through scale layer 118, a $T_{skin\_error}$ 120 is introduced. Embodiments described herein generally leverage the detection and characterization of this $T_{skin\_error}$ quantity in order to provide information regarding build-up of scale or residue, as well as potential corrosion occurring in the pipe wall. As can be imagined, in the event that the pipe wall is abraded or otherwise thinned, the temperature differential will be less than what would be measured for a full-thickness pipe wall.

Figure 3:
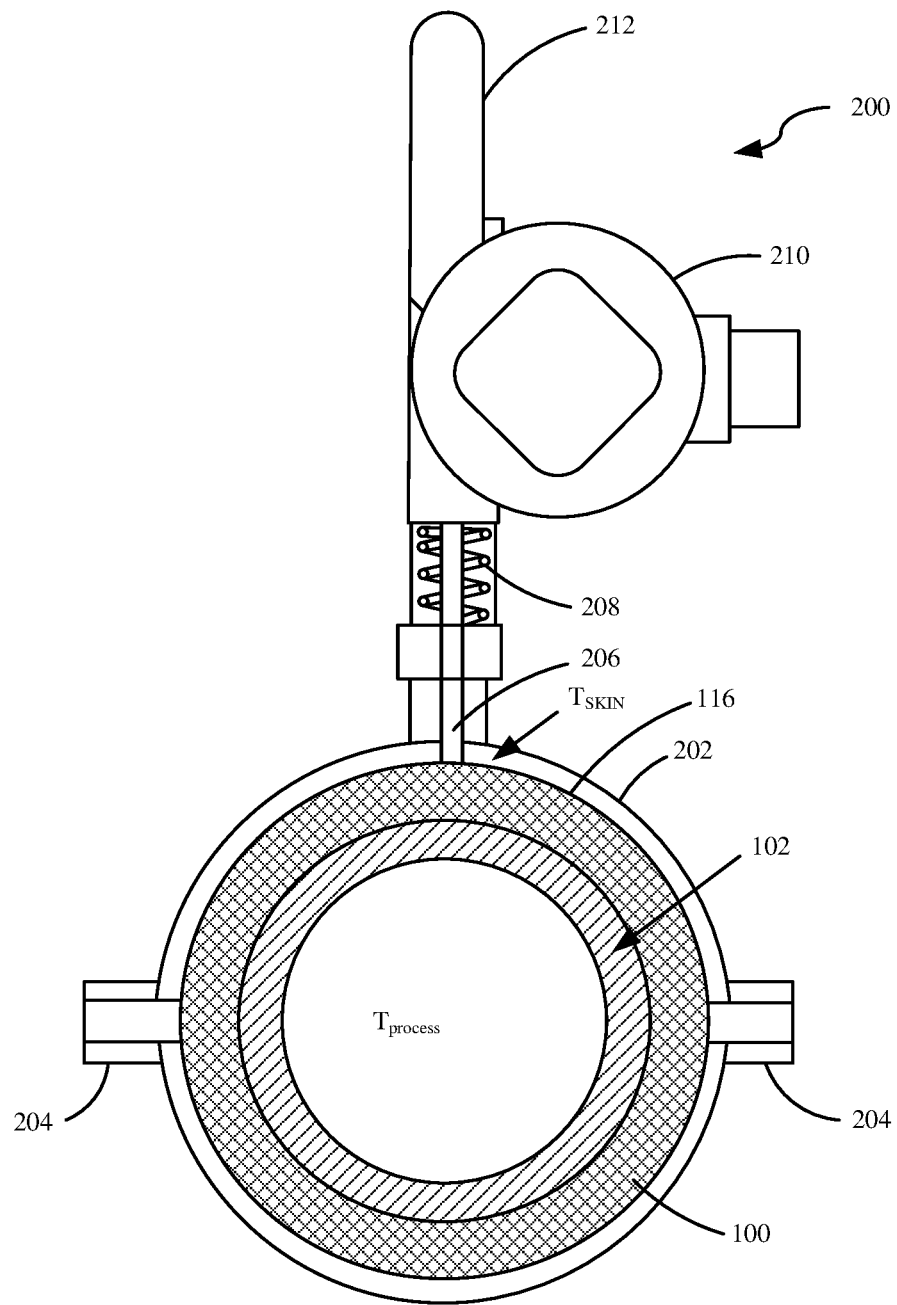
FIG. 3 is a diagrammatic heat flow measurement system with which embodiments described herein are particularly useful.

FIG. 3 is a diagrammatic view of a heat flow measurement system with which embodiments of the present invention are particularly applicable. As illustrated, system 200 generally includes a pipe clamp portion 202 that is configured to clamp around pipe 100. Pipe clamp 202 may have one or more clamp ears 204 in order to allow the clamp portion 202 to be positioned and clamped to pipe 100. Pipe clamp 202 may replace one of clamp ears 204 with a hinge portion such that pipe clamp 202 can be opened to be positioned on a pipe and then closed and secured by clamp ear 204. While the clamp illustrated with respect to FIG. 3 is particularly useful, any suitable mechanical arrangement for securely positioning system 200 about an exterior surface of a pipe can be used in accordance with embodiments described herein.

System 200 includes heat flow sensor capsule 206 that is urged against external diameter 116 of pipe 100 by spring 208. The term "capsule" is not intended to imply any particular structure or shape and can thus be formed in a variety of shapes, sizes and configurations. While spring 208 is illustrated, those skilled in the art will appreciate that various techniques can be used to urge sensor capsule 206 into continuous contact with external diameter 116. Sensor capsule 206 generally includes one or more temperature sensitive elements, such as resistance temperature devices (RTDs). Sensors within capsule 206 are electrically connected to transmitter circuitry within housing 210, which is configured to obtain one or more temperature measurements from sensor capsule 206 and calculate an estimate of the process fluid temperature based on the measurements from sensor capsule 206, and a reference temperature, such as a temperature measured within housing 210, or otherwise provided to circuitry within housing 210.

In one example, the basic heat flow calculation can be simplified into:

$$t_{corrected} = t_{skin} + (t_{skin} - t_{reference}) * (R_{pipe}/R_{sensor}).$$

In this equation, $t_{skin}$ is the measured temperature of the external surface of the conduit. Additionally, $t_{reference}$ is a second temperature obtained relative to a location having a fixed thermal impedance ($R_{sensor}$) from the temperature sensor that measures $t_{skin}$. $R_{pipe}$ is the thermal impedance of the conduit and can be obtained manually based obtaining pipe material information, pipe thickness information and pipe schedule information. Additionally, or alternately, a parameter related to $R_{pipe}$ can be determined during a calibration and stored for subsequent use. Accordingly, using a suitable heat flux calculation, such as that described above, circuitry within housing 210 is able to calculate an estimate for the process fluid temperature ($t_{corrected}$) and convey an indication regarding such process fluid temperature to suitable devices and/or a control room. In the example illustrated in FIG. 3, such information may be conveyed wirelessly via antenna 212.

Figure 4:
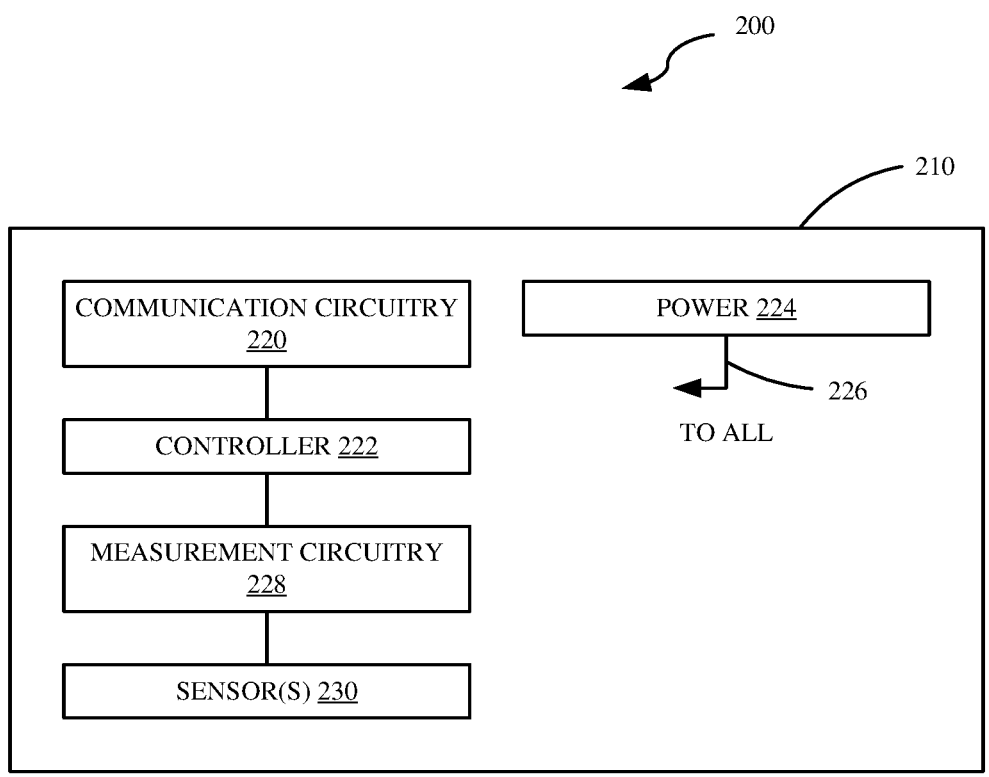
FIG. 4 is a block diagram of a heat flow measurement system in accordance with an embodiment of the present invention.

FIG. 4 is a block diagram of circuitry within housing 210 for the heat flow measurement system in accordance with embodiments of the present invention. System 200 includes communication circuitry 220 coupled to controller 222. Communication circuitry 220 can be any suitable circuitry that is able to convey information regarding the estimated process fluid temperature in addition to diagnostic information relative to pipe 100. Communication circuitry 220 allows the heat flow measurement system to communicate the process fluid temperature output over a process communication loop or segment. Suitable examples of process communication loop protocols include the 4-20 milliamp protocol, Highway Addressable Remote Transducer (HART®) protocol. FOUNDATION™ Fieldbus Protocol, and the WirelessHART protocol (IEC 62591).

Heat flow measurement system 200 also includes power supply module 224 that provides power to all components of system 200 as indicated by arrow 226. In embodiments where the heat flow measurement system is coupled to a wired process communication loop, such as a HART™ loop, or a FOUNDATION™ Fieldbus segment, power module 224 may include suitable circuitry to condition power received from the loop or segment to operate the various components of system 200. Accordingly, in such a wired process communication loop embodiments, power supply module 224 may provide suitable power conditioning to allow the entire device to be powered by the loop to which it is coupled. In other embodiments, when wireless process communication is used, power supply module 224 may include a source of power, such as a battery and suitable conditioning circuitry.

Controller 222 includes any suitable arrangement that is able to generate a heat-flow based process fluid temperature estimate using measurements from sensor(s) within capsule 206 and an additional reference temperature, such as a terminal temperature within housing 210. In one example, controller 222 is a microprocessor.

Measurement circuitry 228 is coupled to controller 222 and provides digital indications with respect to measurements obtained from one or more temperature sensors 230. Measurement circuitry 228 can include one or more analog-to-digital converters and/or suitable multi-plexing circuitry to interface the one or more analog-to-digital converters to sensors 230. Additionally, measurement circuitry 228 can include suitable amplification and/or linearization circuitry as may be appropriate for the various types of temperature sensors employed.

As described above, when scaling 102 occurs within the pipe, the heat transfer characteristics of the pipe/scale system change. This change can be detected in a variety of ways. Heat flow measurements generally rely on the thermal conductivity to be known between the process fluid and the reference temperature, such as transmitter terminals, including the pipe wall. With a turbulent process fluid, the cross-sectional temperature of the process fluid can be assumed to be nearly equal. If the process fluid is turbulent, it will contain a reasonable cross-sectional temperature to provide a good process temperature measurement. There are three configurable parameters that are needed to provide the correction; pipe wall thickness, pipe material, and pipe schedule. These determine the thermal conductivity of the process pipe. In embodiments where these quantities are known ahead of time, they can be entered into controller 222 either during manufacture, or during field configuration. However, since the pipe wall thickness, pipe material, and pipe schedule generally do not change, these parameters can also be considered to be a constant such that if a known process fluid temperature is provided to controller 222 when controller 222 is able to measure pipe skin temperature using capsule 206, a quantity related to the thermal conductivity, if not the thermal conductivity itself, of the process pipe can be calculated by controller 222. This quantity can be stored and compared with subsequent calculations to determine if the quantity changes. Such changes are then deemed indicative of potential scaling or corrosion.

Accordingly, controller 222 can employ a heat flow calculation, such as that described above, to measure the heat flow through a process pipe and a reference temperature internal to the pipe. A comparison can then be used to determine the level of build-up or thickness of the process pipe. When the temperatures deviate beyond a specified limit (indicating a threshold level of buildup), maintenance can be scheduled.

Since the heat transfer calculation employed by controller 222 infers the process fluid temperature within a pipe, it generally needs to consider the pipe wall thickness and pipe material for an accurate output. Scaling in a pipe will generally act as a thermal insulator between the process fluid and the pipe, resulting in a change in skin temperature. For example, a 6" carbon steel pipe that has a 1% blockage of scaling will provide a discrepancy or error ($T_{skin\_error}$) that is about 2% of the temperature difference between ambient and process fluid temperature in the output.

Figure 5A:
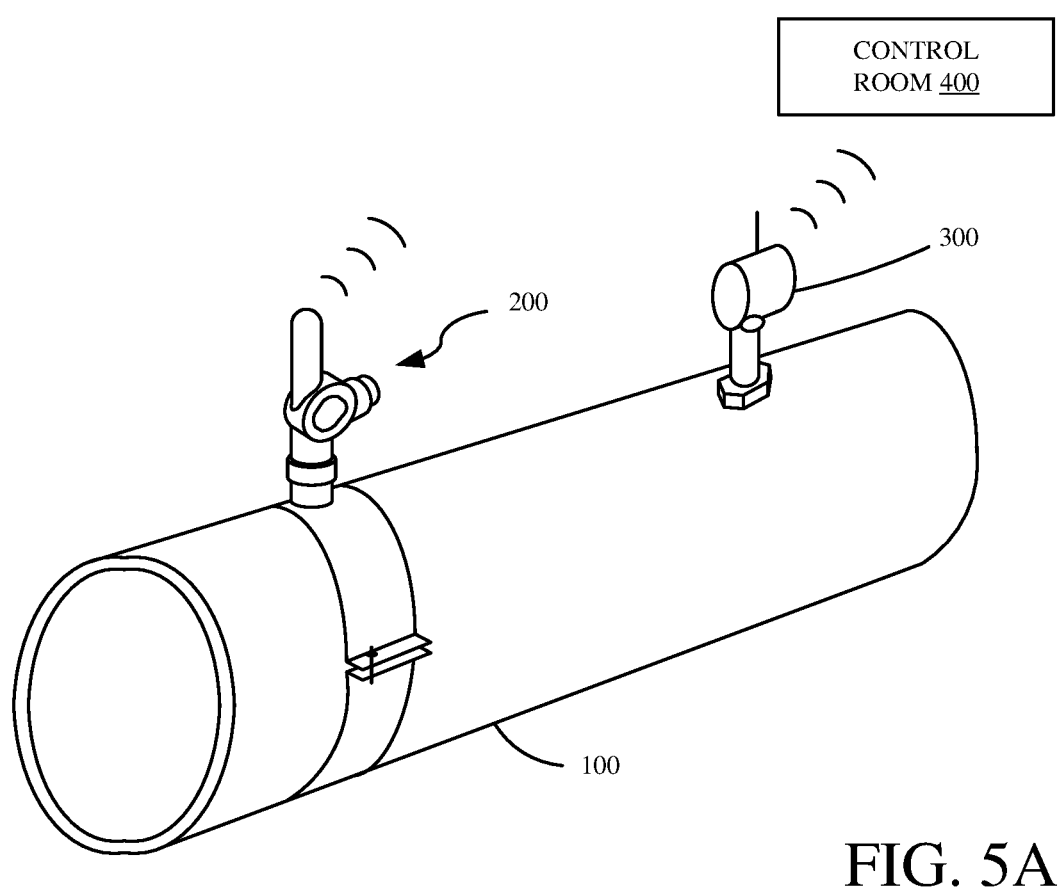
FIG. 5A is a diagrammatic view of a heat-flow based pipe diagnostic system in accordance with an embodiment of the present invention.

FIG. 5A is a diagrammatic view of a heat-flow based pipe diagnostic system in accordance with an embodiment of the present invention. System 200 is clamped to pipe 100 and is configured to obtain a skin temperature t_skin on an external diameter of pipe 100. Using this t_skin measurement, in combination with a transmitter terminal measurement, system 200 can provide an estimate of process fluid temperature present within pipe 100. System 200 conveys its process fluid temperature estimation to control room 400 wirelessly, such as in accordance with IEC62591. Additionally, a process fluid temperature measurement sensor 300 is also disposed on pipe 100 and includes a thermowell or other suitable sensor to measure the temperature of process fluid within pipe 100. The temperature measured by transmitter 300 can be provided digitally to system 200 by control room 400. Then, system 200 can compare its estimated process fluid temperature with the digitally-received process fluid temperature measurement from system 300 in order to detect or otherwise characterize drift or error ($T_{skin\_error}$) induced by scaling or pipe thinning. While this drift may be detected by system 200, it can also be detected by any suitable device in the process control system that is able to receive such information and provide the comparison. Accordingly, the comparison and thus detection of scaling or pipe thinning may be accomplished by a device operating in control room 400.

Figure 5B:
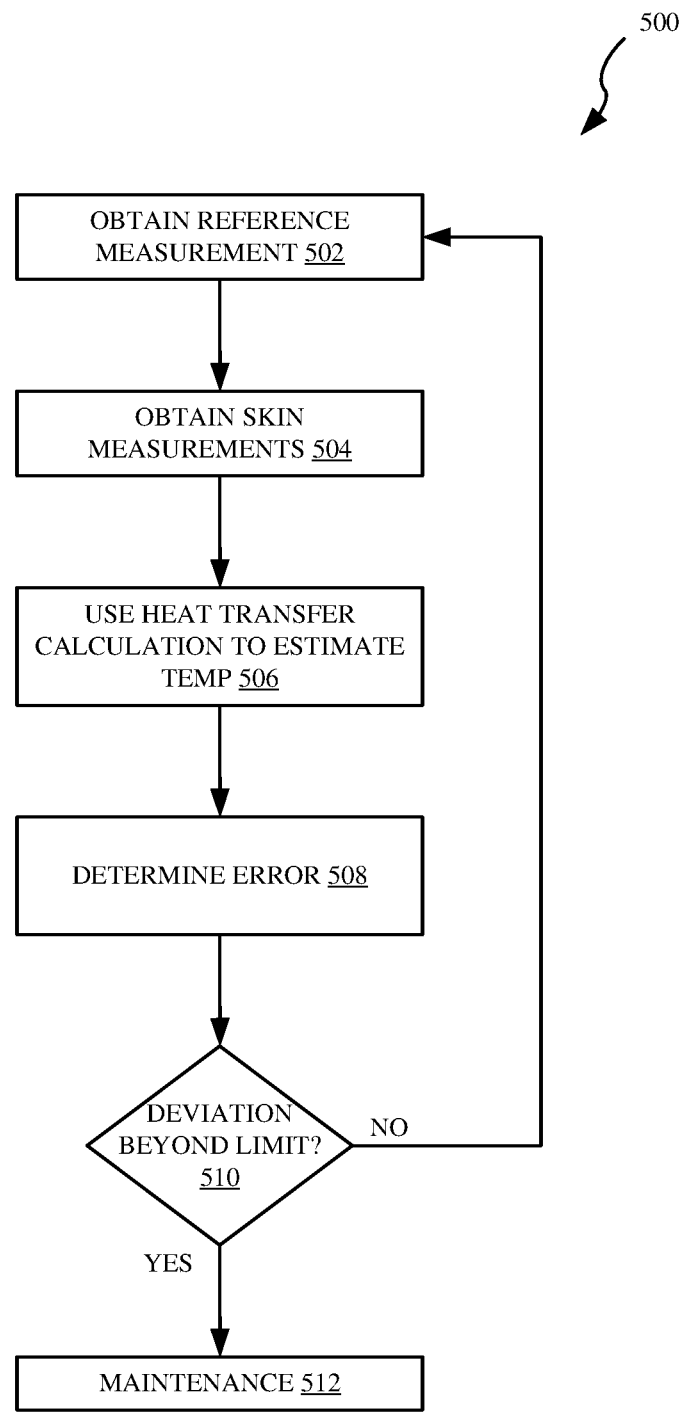
FIG. 5B is a flow diagram of a method of providing pipe diagnostics in accordance with an embodiment of the present invention.

FIG. 5B is a flow diagram of a method of providing pipe diagnostics in accordance with an embodiment of the present invention. Method 500 begins at block 502 where a reference process fluid temperature measurement is obtained. This reference process fluid temperature measurement can be provided by another device measuring process fluid temperature within the process system, or even another heat-flow based pipe diagnostic system in accordance with embodiments described herein. Alternatively, if the process fluid temperature is well-controlled, the assumed temperature can be used as the reference measurement for the temperature comparison when evaluating buildup. Next, at block 504, a pipe skin measurement and a reference transmitter temperature are obtained. The pipe skin measurement is obtained from one or more temperature sensitive elements positioned within sensor capsule 206 (shown in FIG. 3). The reference transmitter temperature can be measured using a temperature sensor disposed within housing 210 (shown in FIG. 3). At block 506, a heat transfer calculation is applied to the reference transmitter measurement and the pipe skin measurement in order to generate an estimate of process fluid temperature within the pipe. At block 508, the amount of error in the estimate is calculated. This error can be calculated by comparing the estimate with the known process fluid measurement, or by comparing the estimate with a separate estimate from another heat-flow based heat diagnostic system. For example, if pipe scaling deposits are known to accumulate non-uniformly about the interior diameter of a pipe, one system may be configured to detect pipe scaling on a bottom interior diameter of a pipe, while a second system may be configured to detect scaling at a top interior diameter. Thus, the two systems would have the same relatively low error when no scaling is present. However, as scaling develops on one of the surfaces, such as the bottom surface, error induced in that system's measurement can be detected by comparison with the top system's measurement. Regardless of how the error is detected, at block 510, the error or deviation is compared to an acceptable error limit. If the error is beyond the limit, maintenance 512 is advised. If the deviation is not beyond the limit, the system repeats by returning control to block 502.

Figure 6A:
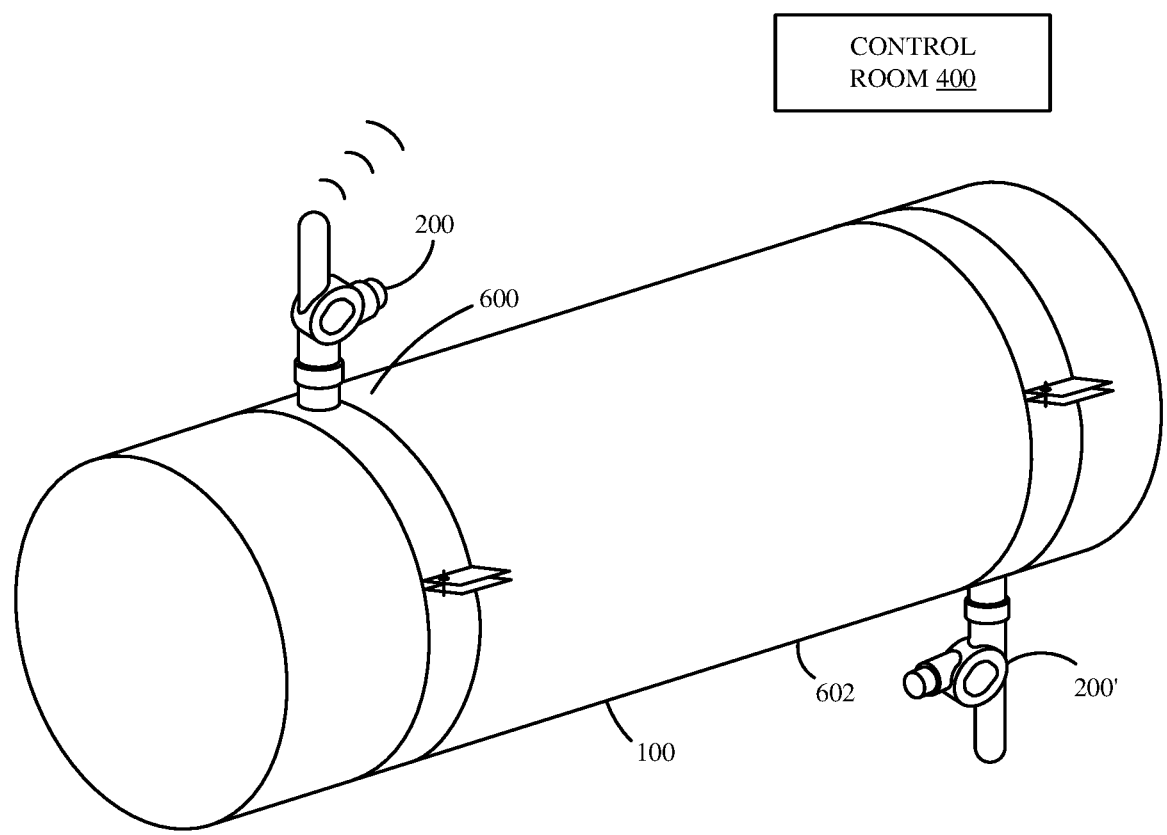
FIG. 6A is a diagrammatic view of a heat-flow based pipe diagnostic system in accordance with an embodiment of the present invention.

FIG. 6A is a diagrammatic view of a pair of heat-flow based pipe diagnostic systems in accordance with an embodiment of the present invention. As shown in FIG. 6A, system 200 is clamped to pipe 100 such that its sensor capsule is positioned proximate top portion 600 of pipe 100. Additionally, system 200' is positioned such that its sensor capsule is disposed near bottom surface 602 of pipe 100. Each of systems 200, 200' report their estimate of process fluid temperature to control room 400 wirelessly. When no scaling or corrosion is present, the quantities reported by systems 200 and 200' should be virtually identical. However, if pipe scale begins to build with respect to one side or the other of pipe 100, the estimates will no longer agree. In this way, the drift of one system relative to the other can be considered to be indicative of a condition occurring within pipe 100 that either currently or will in the future require maintenance.

Figure 6B:
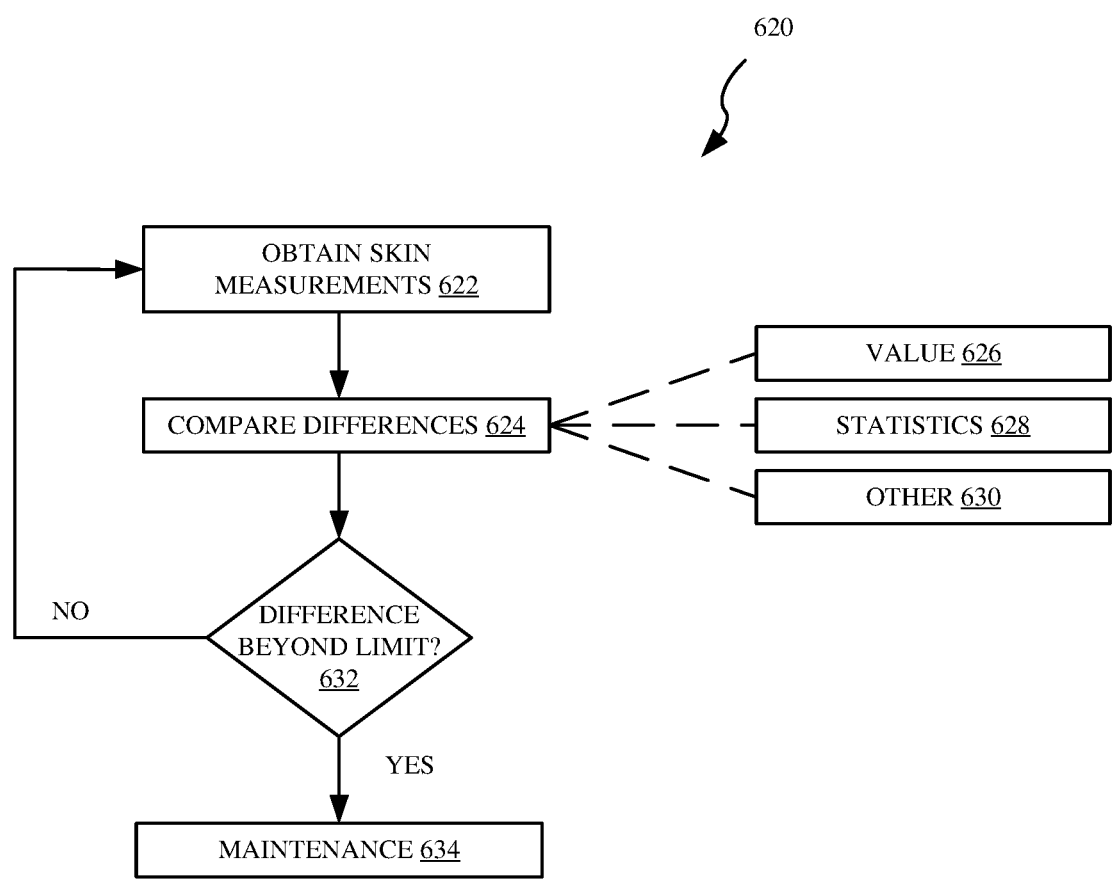
FIG. 6B is a flow diagram of a method of providing heat-flow pipe diagnostics in accordance with an embodiment of the present invention.

FIG. 6B is a flow diagram of a method 620 of providing pipe diagnostics in accordance with an embodiment of the present invention. Method 620 begins at block 622 where skin measurements from a plurality of heat-flow based process fluid temperature estimation systems, such as system 200 and 200' (shown in FIG. 6A) are obtained. Next, at block 624, the differences between the two skin measurements are obtained. These differences can be compared in any number of ways in order to identify scaling or trends in the estimations. For example, the differences between the values themselves can simply be compared, as shown at block 626. Further, statistics relative to each skin measurement can be compared. For example, variation and/or a standard deviation of each skin measurement over a defined time period can be compared between system 200 and system 200'. In this way, an indication of additional noise or variability in one skin temperature sensor measurement relative to the other may be indicative of corrosion or scale deposits. Additionally, as indicated at block 630, any other suitable technique for comparing the differences between the two skin temperature measurements can be used. Next, at block 632, it is determined whether the difference between the skin measurements is beyond a selected limit. If so, maintenance is advised, as indicated at block 634. When such maintenance is advised, a process communication can be sent to a responsible person, such as a process operator, to indicate that pipe maintenance is due or will be due soon. Additionally, suitable annunciators, such as audible/visual annunciators can be engaged at each respective heat-flow based diagnostic system and/or on a suitable device within control room 400.

Figure 6C:
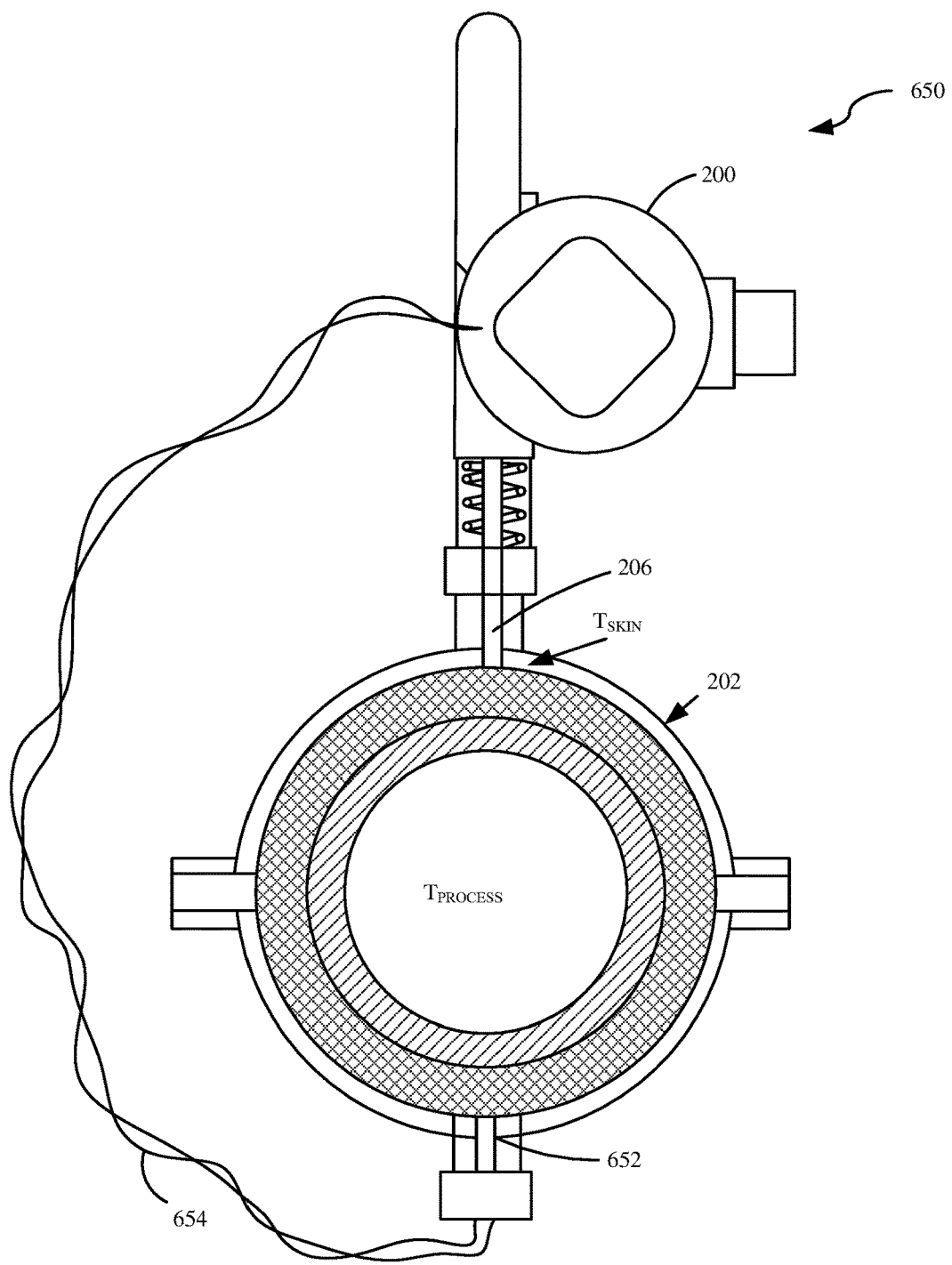
FIG. 6C is a diagrammatic view of a multi-point heat flow measurement system in accordance with an embodiment of the present invention.

FIG. 6C is a diagrammatic view of a heat-flow based pipe diagnostic system in accordance with another embodiment of the present invention. System 650 is similar to system 200, but includes an additional sensor capsule 652 that is positioned, in the example illustrated in FIG. 6C, diametrically opposite from sensor capsule 206. Sensor capsule 652 is electrically coupled to circuitry within housing 210. In the example shown in FIG. 6C, this electrical coupling is shown diagrammatically via conductors 654. However, in practice, such interconnection will generally be provided in the form of flexible circuits, or other suitable conductors, that are mounted to or otherwise affixed to various portions of pipe clamp 202. System 650 provides the advantages of the system described with respect to FIGS. 6A and 6B, in a single device. Additionally, while a pair of sensor capsules are shown in FIG. 6C, it is expressly contemplated that additional sensor capsules can be coupled to pipe clamp 202 to provide additional measurement locations and/or sensor fidelity. Further, such additional sensors could be linearly distributed within a wrap that encircles all or a portion of the pipe. This wrap could be coupled to the pipe to identify differences in temperature. Relative drift or an increase/decrease in measurement noise in one point or another could indicate buildup or thinning.

Figure 7:
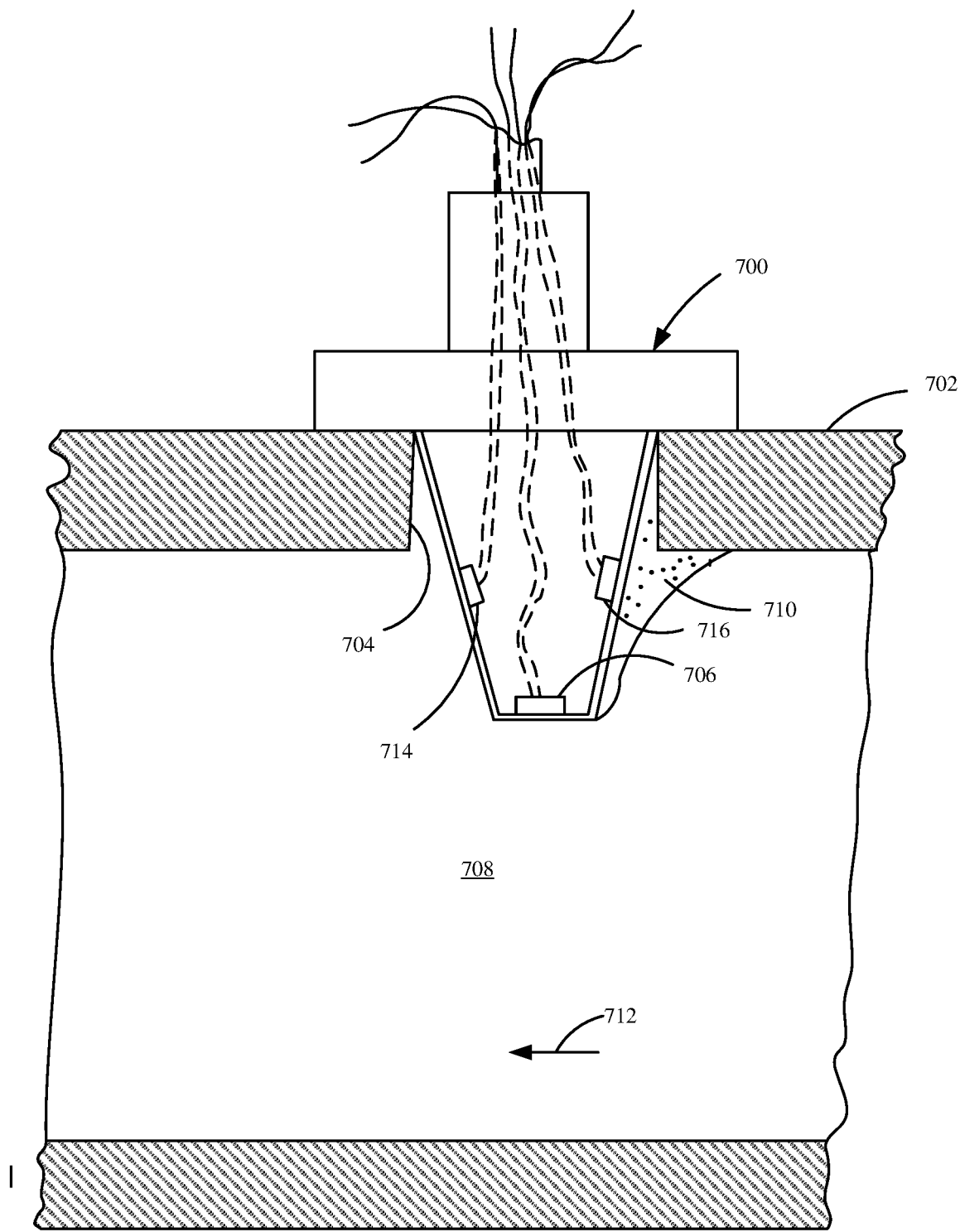
FIG. 7 is a cross-sectional diagrammatic view of a thermowell incorporating aspects of the present invention to detect corrosion/buildup relative to the thermowell wall.

FIG. 7 is a cross-sectional diagrammatic view of a thermowell incorporating aspects of the present invention to detect corrosion/buildup relative to the thermowell wall. Thermowell 700 is mounted to pipe 702 through aperture 704, Thermowell 700 includes a temperature sensor 706 disposed in a distal end of the thermowell and configured to sense a temperature of process fluid flowing within conduit 702. As can be seen, due to its location within the flow of process fluid, thermowell 700 has accumulated a scale deposit 710 on its upstream side (note process fluid flow direction is indicated by arrow 712). In accordance with an embodiment of the present invention, thermowell 700 includes two additional temperature sensors 714, 716, much the same way that system 650 (shown in FIG. 6C) has a pair of sensor capsules 206, 652 diametrically opposite each other. Thus, the interior of the thermowell can be considered to be like the process fluid conduit and the measurements from individual sensors can be used for corrosion/deposit diagnostics.

When buildup 710 begins to form, the heat flow from process fluid 708 to temperature sensor 716 will need to go through buildup 710 resulting in a drop in temperature. In contrast, heat flowing from process fluid 708 to temperature sensor 714 will not pass through any buildup and thus will not have the resulting drop in temperature. Comparing the readings from sensor 714 with that of sensor 716 can thus provide an indication that buildup/corrosion is occurring. Note, while the example shown in FIG. 7 shows a pair of additional sensors 714, 716 disposed at roughly the same distance from the center of conduit 702, it is expressly contemplated that additional sensor can be placed at different distances from the center of conduit 702. Further, the measurement from temperature sensor 706 can also be used to facilitate corrosion/buildup diagnostics.

While the embodiment described with respect to FIG. 7 provides additional temperature sensors within a thermowell to provide corrosion/buildup diagnostics, it is expressly contemplated that the technique described therein can be applied to any element disposed within a flow of process fluid, such as without limitation, an orifice plate, a shedder bar, and a flow conditioner.

If the process temperature is relatively well controlled and does not change frequently, the assumed temperature can actually be used as the reference measurement for the temperature comparison when evaluating build-up. Further, the heat transfer calculation may, in such cases, only require one surface measurement and the assumed ambient temperature along with the reference process fluid temperature measurement for evaluating build-up.

Although the present invention has been described with reference to preferred embodiments, workers skilled in the art will recognize that changes may be made in form and detail without departing from the spirit and scope of the invention. While the present invention has been described with respect to diagnostics relative to an internal diameter of a pipe, such diagnostics can be extended to thermowells, less invasive thermowells, external temperatures, and insulated bare capsule sensors.

What is claimed is:

1. A pipe diagnostic system comprising:
   a sensor capsule configured to be coupled to an exterior surface of a pipe, the sensor capsule having at least one temperature sensitive element disposed therein;
   measurement circuitry coupled to the sensor capsule and configured to measure an electrical characteristic of the at least one temperature sensitive element and provide an indication of the measurement;
   a controller coupled to the measurement circuitry, the controller being configured to obtain a transmitter reference measurement and employ a heat transfer calculation with the transmitter reference measurement and the indication to generate an estimated process fluid temperature; and
   wherein the controller is further configured to obtain an indication of process fluid temperature and provide a pipe diagnostic indication based on a comparison of the estimated process fluid temperature and the obtained indication of process fluid temperature.

2. The pipe diagnostic system of claim 1, wherein the controller is configured to communicate the pipe diagnostic indication to a remote device using the communication module.

3. The pipe diagnostic system of claim 1, and further comprising a clamping assembly configured to couple the sensor capsule to the exterior surface of the pipe.

4. The pipe diagnostic system of claim 1, wherein the temperature sensitive element is a resistance temperature device.

5. The pipe diagnostic system of claim 1, wherein the transmitter reference measurement is obtained from a temperature sensor disposed within an electronics housing of the pipe diagnostic system.

6. The pipe diagnostic system of claim 1, and further comprising a second sensor capsule disposed to measure the process fluid temperature and provide an indication of the process fluid temperature to the controller.

7. The pipe diagnostic system of claim 1, wherein the pipe diagnostic indication is one of build-up or scaling within the pipe.

8. The pipe diagnostic system of claim 1, and further comprising a communication module coupled to the controller, the communication module being configured to receive information indicative of the indication of process fluid temperature.

9. The pipe diagnostic system of claim 8, wherein the communication module is a wireless communication module.

10. The pipe diagnostic system of claim 1, and further comprising a second sensor capsule coupled to the measurement circuitry and configured to be coupled to the external surface of the pipe at a different radial location relative to the pipe than the sensor capsule.

11. The pipe diagnostic system of claim 10, wherein the sensor capsule and the second sensor capsule are configured to be coupled diametrically opposite from one another.

12. The pipe diagnostic system of claim 1, wherein the controller is configured to receive an indication of pipe wall diameter, pipe wall material, and pipe schedule to determine a thermal conductivity of the pipe.

13. The pipe diagnostic system of claim 12, wherein the determined thermal conductivity of the pipe is employed to execute the heat transfer calculation.

14. The pipe diagnostic system of claim 13, wherein the controller is configured to use the indication of process fluid temperature to calculate a current thermal conductivity and to compare the current thermal conductivity to the thermal conductivity of the pipe to provide the pipe diagnostic indication.

* * * * *

UNITED STATES PATENT AND TRADEMARK OFFICE
CERTIFICATE OF CORRECTION

PATENT NO. : 10,760,742 B2
APPLICATION NO. : 15/934101
DATED : September 1, 2020
INVENTOR(S) : Jason H. Rud and Steven R. Trimble It is certified that error appears in the above-identified patent and that said Letters Patent is hereby corrected as shown below:

In the Claims

Column 9, Line 6, Claim 2, delete "the" after "using" and insert --a--.

Column 10, Line 24, Claim 14, delete "the" before "thermal".

Signed and Sealed this
Twenty-fifth Day of October, 2022

Katherine Kelly Vidal
*Director of the United States Patent and Trademark Office*